US012789756B2

(12) United States Patent
Del Gizzi et al.

(10) Patent No.: US 12,789,756 B2
(45) Date of Patent: Nov. 10, 2026

(54) AUTONOMOUS REFUELING SYSTEM

(71) Applicant: Stratom, Inc., Boulder, CO (US)

(72) Inventors: Ryan Del Gizzi, Arvada, CO (US); Broc Sommermeyer, Windsor, CO (US); Kristin Farris, Arvada, CO (US); Zachary Allen, Superior, CO (US); Ross Wehner, Erie, CO (US); Mark Gordon, Lafayette, CO (US)

(73) Assignee: Stratom, Inc., Louisville, CO (US)

( * ) Notice: Subject to any disclaimer, the term of this patent is extended or adjusted under 35 U.S.C. 154(b) by 299 days.

(21) Appl. No.: 17/700,425

(22) Filed: Mar. 21, 2022

(65) Prior Publication Data

US 2023/0294644 A1 Sep. 21, 2023

(51) Int. Cl.

*B60S 5/02* (2006.01)
*B25J 9/16* (2006.01)
*B64F 1/28* (2006.01)

(52) U.S. Cl.

CPC ............... *B60S 5/02* (2013.01); *B25J 9/1697* (2013.01); *B64F 1/28* (2013.01)

(58) Field of Classification Search

CPC .... B60S 5/02; B64F 1/28; G05B 2219/40082; B67D 7/0401; B67D 2007/0473
See application file for complete search history.

(56) References Cited

U.S. PATENT DOCUMENTS 2,901,008 A * 8/1959 Cavett ..................... B61C 17/02 105/62.1
4,262,712 A * 4/1981 Young ...................... B67D 7/54 141/DIG. 1
6,237,647 B1 * 5/2001 Pong ...................... B67D 7/348 141/94
8,393,362 B1 * 3/2013 Hollerback .............. B25J 11/00 414/730
2006/0237591 A1 * 10/2006 McCoskey .............. B64C 25/42 244/135 R
(Continued)

FOREIGN PATENT DOCUMENTS

WO WO-0140108 A1 * 6/2001 ........... B67D 7/0401

OTHER PUBLICATIONS

International Search Report and Written Opinion—PCTUS2023015501—ISA/EPO—Mar. 17, 2023.

*Primary Examiner* — Khoi H Tran
*Assistant Examiner* — Tristan J Greiner
(74) *Attorney, Agent, or Firm* — Buchalter; Jason W. Croft

(57) ABSTRACT

Systems and techniques are provided for autonomous or semi-autonomous connection and disconnection of an end effector to a port, such as a refueling port associated with a fuel tank. The end effector may be coupled with a carriage system, such as a robotic arm and have a connection with a supply source. A sensor suite may be coupled with the carriage system and output optical and/or proximity data that is received at a controller system. The controller system may identify a location of the port, position the end effector in proximity with the port, and provide a connection therebetween. The controller system may identify a fiducial target associated with the port that provides for alignment with the end effector and port. The end effector may also include a compensation system to adjust a location of the end effector to a finer degree than is possible using the carriage system.

18 Claims, 10 Drawing Sheets

(56) References Cited

U.S. PATENT DOCUMENTS

| | | | | |
|---|---|---|---|---|
| 2012/0080563 | A1* | 4/2012 | Gryniewski | B64G 1/4024<br>244/172.4 |
| 2016/0346940 | A1* | 12/2016 | Bax | A61B 34/30 |
| 2018/0215043 | A1* | 8/2018 | Michalakis | B25J 11/008 |

* cited by examiner

AUTONOMOUS REFUELING SYSTEM

STATEMENT REGARDING FEDERALLY SPONSORED RESEARCH OR DEVELOPMENT

This invention was made with Government support under SBIR Contract Numbers W911W619C0082 and W56HZV-17-C-0062; contracted through the United States Army. The Government may have certain rights to this invention.

FIELD

The present disclosure is directed to autonomous refueling systems and, more specifically, to refueling systems including an end effector assembly that couples with a fueling port of a target vehicle.

BACKGROUND

Numerous different types of vehicles and other equipment rely on on-board engines or motors to provide mechanical energy to do some type of work. For example, a vehicle may include one or more internal combustion engines (e.g., spark ignition engines, diesel engines, gas turbine engines, etc.) to power and move the vehicle. Internal combustion engines require some type of fuel, which is commonly stored in a fuel tank of the vehicle or piece of equipment (e.g., electric generator), and when fuel is consumed refueling is performed to provide fuel to refill the fuel tank. Refueling operations can be time consuming for individuals, as a refueling hose is commonly connected and disconnected to and from a fuel tank manually. Further, depending on the location and environment, having a person manually connect and disconnect a refueling line can present hazards. Thus, efficient techniques for performing refueling operations may reduce labor involved in refueling, and enhance safety.

SUMMARY

Various aspects of the present disclosure provide autonomous refueling systems that provide the ability to autonomously connect and disconnect a refueling line to a fueling port associated with a fuel tank to refill the tank. In some cases, an autonomous refueling system may include an end effector coupled with a carriage system. The carriage system may include, for example, a six-axis robotic arm having the end effector attached thereto, and a fluid connection (e.g., hoses or pipes) with a fuel supply. A sensor suite may be coupled with the carriage system and be configured to output optical and/or proximity data that is received at a controller system. The controller system may identify a location of a fuel port, position the end effector in proximity with the fuel port, and provide fuel to the vehicle responsive to the engagement of the fuel nozzle with the fuel port. In some cases, the controller system is configured to identify a fiducial target associated with the fuel port, which is used to align the fuel nozzle with the fuel port. In some cases, the end effector may also include a compensation system that may be used to adjust a location of the fuel nozzle to a finer degree than is possible using the carriage system (e.g., robotic arm). Such a compensation system may allow for a less expensive and less complex robotic arm, for example.

In some aspects, the techniques described herein relate to a refueling apparatus, including: an end effector coupled with a carriage system, the end effector including a fuel nozzle and a compensation system; a sensor suite configured to output a location of a fuel port; and a controller system coupled with the end effector, the carriage system, the compensation system, and the sensor suite, and configured to identify the location of the fuel port on a vehicle, position the end effector in proximity with the fuel port, adjust the fuel nozzle using the compensation system to engage the fuel nozzle with the fuel port, and provide fuel to the vehicle responsive to the engagement of the fuel nozzle with the fuel port.

In some aspects, the techniques described herein relate to a refueling apparatus, wherein: the controller system is configured to identify a fiducial target associated with the fuel port.

In some aspects, the techniques described herein relate to a refueling apparatus, wherein: the sensor suite includes one or more of a positioning sensor, proximity detector, optical camera, ultrasonic sensor, LIDAR sensor, or any combinations thereof, and wherein the fiducial target is identified by the controller system based at least in part on signals provided by the sensor suite.

In some aspects, the techniques described herein relate to a refueling apparatus, wherein: the sensor suite further includes a vehicle detection and identification sensor, and wherein the controller system identifies a particular vehicle for identification of associated refueling characteristics based at least in part on information from the vehicle detection and identification sensor.

In some aspects, the techniques described herein relate to a refueling apparatus, wherein: the vehicle detection and identification sensor includes one or more of an optical scanner, radar, radio frequency identification (RFID) tag reader, or any combinations thereof.

In some aspects, the techniques described herein relate to a refueling apparatus, wherein: the controller system is configured to output a vehicle identification and an amount of fuel provided to a revenue management or analytics system.

In some aspects, the techniques described herein relate to a refueling apparatus, wherein: the compensation system provides fine-tuning of the fuel nozzle relative to the fuel port via one or more mechanical linkages that adjust a position of the fuel nozzle with finer resolution than is provided by the carriage system.

In some aspects, the techniques described herein relate to a refueling apparatus, wherein: the compensation system includes one or more actuation components coupled between the fuel nozzle and the end effector, one or more mechanical isolators, or any combinations thereof.

In some aspects, the techniques described herein relate to a refueling apparatus, wherein: the compensation system further includes a compression spring coupled between the fuel nozzle and the end effector that counteracts a load of the fuel nozzle due to gravity.

In some aspects, the techniques described herein relate to a refueling apparatus, further including: a valve system coupled with the fuel nozzle, and wherein the controller system is configured to actuate the valve system to provide for flow of fuel between a fuel supply and the fuel port.

In some aspects, the techniques described herein relate to a refueling apparatus, wherein: actuation of the valve system is provided by a rotation carried out by the carriage system opens one or more valves coupled with the fuel nozzle and that further actuates a secondary valve within the fuel port.

In some aspects, the techniques described herein relate to a refueling apparatus, wherein: the sensor suite further includes a pressure sensor coupled with a seal or gasket within the fuel nozzle, and wherein actuation of the valve system is performed responsive to an output of the pressure sensor that indicates the fuel nozzle is fully coupled with the fuel port.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
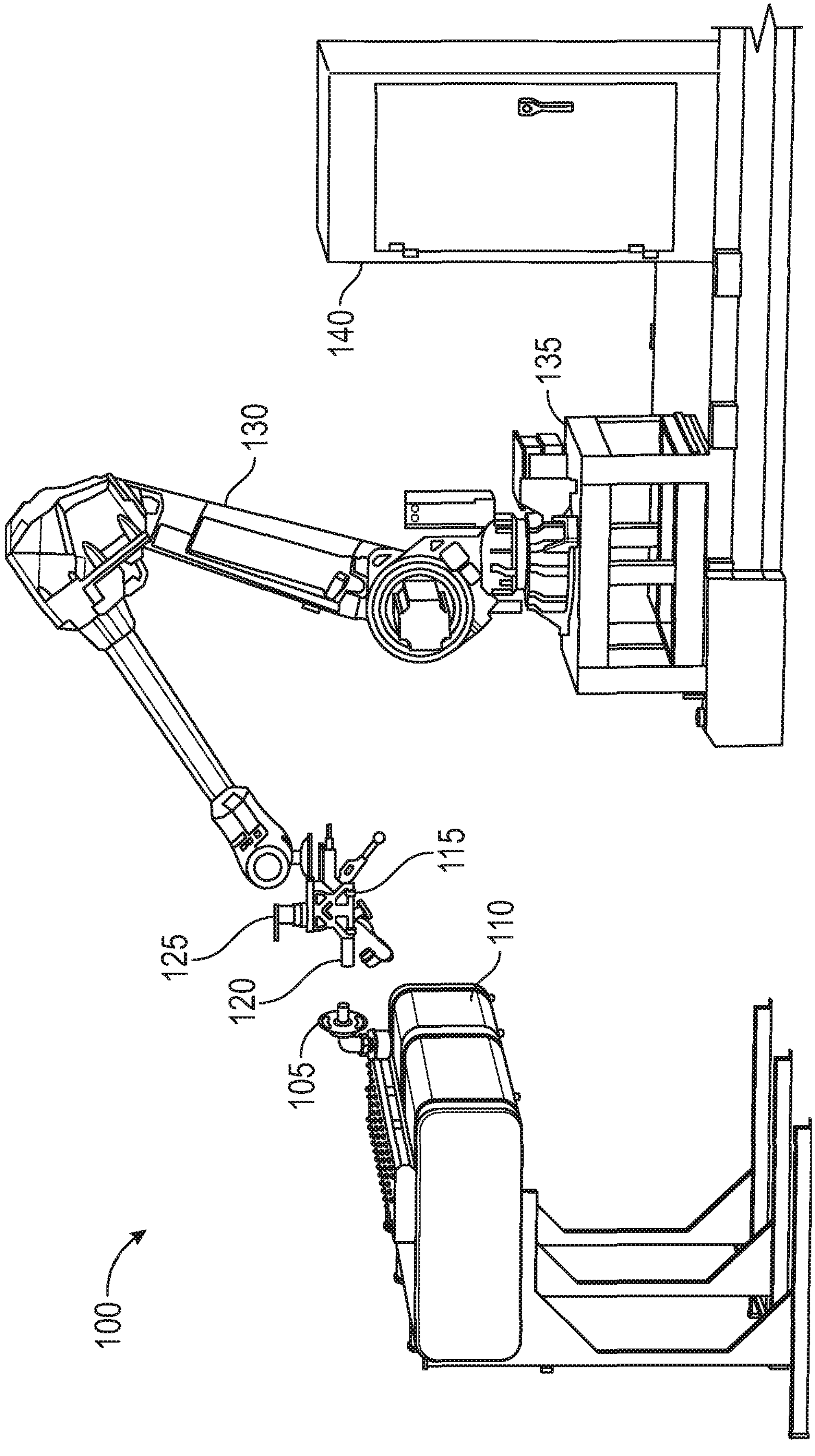
FIG. 1 shows an autonomous refueling system in accordance with various aspects of the present disclosure.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements. Thus, various implementations of techniques and components as discussed herein may omit, substitute, or add various procedures or components as appropriate. For instance, aspects and elements described with respect to certain examples may be combined in various other examples. It should also be appreciated that the following systems, devices, and components may individually or collectively be components of a larger system, wherein other procedures may take precedence over or otherwise modify their application.

Various examples disclosed herein provide an autonomous refueling system including an end effector that couples with a fueling port and refuels a vehicle or piece of equipment associated with the fueling port. In some cases, with one or more control systems may control a robotic arm that carries the end effector, and may control one or more actuators on the end effector, to couple the end effector with the fueling port and commence fueling operations. In some cases, a target at the fueling port may be identified by one or more sensing systems of the end effector, and a location of the fueling port identified based on the identification of the target. The end effector, in some cases may include a compensation mechanism that allows for compensation of errors in the positioning of the end effector by the robotic arm to properly mate a fuel nozzle at the end effector with the fueling port. Such systems provide a refueling system with an advanced ability to autonomously or semi-autonomously move the end effector to engage with the fueling port to refuel a vehicle or piece of equipment, with relatively little operator involvement. Such techniques may reduce an amount of manual labor used to connect a fuel nozzle to the target fuel port on the vehicle, which saves on personnel costs associated with refueling operations, and also enhances safety (e.g., by reducing a number of people in proximity to dangerous environments associated with refueling), and enhances efficiency of refueling operations. While various aspects are described herein with respect to specific mechanical designs compatible with military aircraft and vehicles, the systems as discussed herein may be used in numerous other commercial, industrial, residential, and military settings having different use cases and refueling specifications. Further, while refueling examples are discussed, systems and techniques discussed herein may be used for providing other materials to a vehicle, aircraft, or other piece of equipment, such as to supply water, fuel, compressed natural gas, diesel exhaust fluid, other fluids or gasses (e.g., oxygen, hydrogen, nitrogen, etc.), chemicals, or any combinations thereof. The systems and techniques discussed herein may also be used couple an end effector to a port to remove any fluids (e.g., wastewater), gasses, or other materials. Additionally, or alternatively, systems and techniques discussed herein may also be used couple an end effector to a port for electricity transfer, data transfer, or both. Once the fueling commences, the refueling system in some cases may position the carriage system in a stowed orientation that allows for the refueled vehicle to safely drive away.

To operate autonomously and safely, the refueling systems of various aspects utilize a suite of sensors to detect fuel ports and identify status associated with the system. Such sensors may include, for example, positioning sensors, inertial measurement units (IMUs), proximity detectors, cameras, stereographic imaging sensors, ultrasonic sensors, LIDAR systems, or any combinations thereof, to name a few. In some cases, 3D sensor units may be used that may provide data that may be used for 3D sensing around a system, such as stereographic imaging sensors, ultrasonic sensors, 3D flash LIDAR, LIDAR, radar, and cameras coupled with image processing and recognition, for example. Further, aspects discussed herein may also have vehicle detection and identification sensors, such as sensors (e.g., optical, radar, radio frequency identification (RFID), and ultrasonic sensors or rangefinders, etc.) that identify a particular vehicle for identification of associated refueling characteristics (e.g., type of fuel, amount of fuel to be provided, etc.). Information from the suite of sensors may be used to couple the fuel nozzle at the end effector with the fuel port to reliably perform refueling operations during day and night lighting conditions and in the presence of dust, fog, or haze. Further, in some cases the vehicle identification may be logged along with a time and amount of fuel provided, which may be used for fleet analytics, billing, and the like.

With reference now to FIGS. 1-4, an example of a refueling system 100 is discussed. In this example, a fuel port 105 may be coupled with a fuel tank 110. The fuel port 105 and fuel tank 110 are illustrated in FIG. 1 as simply being a stand, with the understanding that a fuel tank 110 and fuel port 105 may be located on any type of structure, aircraft, or vehicle. Further, as discussed above, while examples discussed herein are with relation to refueling, the systems and techniques may be applied to the connection of any type of port for any type of fluid, gas, material, electricity, or data transfer. An end effector 115 may include a fuel nozzle 120 and a sensor suite 125 and is mounted to a robotic arm 130. The robotic arm 130 may be mounted on a support structure 135 that is coupled with a fuel reservoir (e.g., a supply tank). A control system and power supply 140 may provide power and control communications to the robotic arm 130, the end effector 115, or both. In some cases, the robotic arm 130 and end effector 115 may be located at a fueling area of a support facility for vehicles or aircraft, and vehicles or aircraft may have associated fuel ports 105 and move within proximity of the robotic arm 130 and end effector 115 to be refueled. For example, an aircraft may have an associated fuel port 105 and taxi to a location of a tarmac that is adjacent to the robotic arm 130 and end effector 115. When the aircraft stops movement, a command may be provided to the refueling system that causes the robotic arm 130 to move the end effector 115 to couple with the fuel port 105 and refuel the aircraft. In some cases, multiple refueling stations may be present, allowing multiple aircraft to be concurrently refueled. In other deployments, one or more refueling systems may be provided for truck or automobile (or any other vehicle) refueling. In some cases, the robotic arm 130 may be a six-axis robotic arm, although other types of robotic arms may be implemented and are within the scope of the present disclosure. In some cases, the type of robotic arm may be selected based on, for example, desired reach of the arm, a payload to be carried (e.g., a combined payload of the end effector 115 and fuel supply line, with each containing fuel), environmental conditions (e.g., whether the system is deployed in a controlled environment or is a field deployment that may experience adverse weather conditions), or any combinations thereof.

Figure 2:
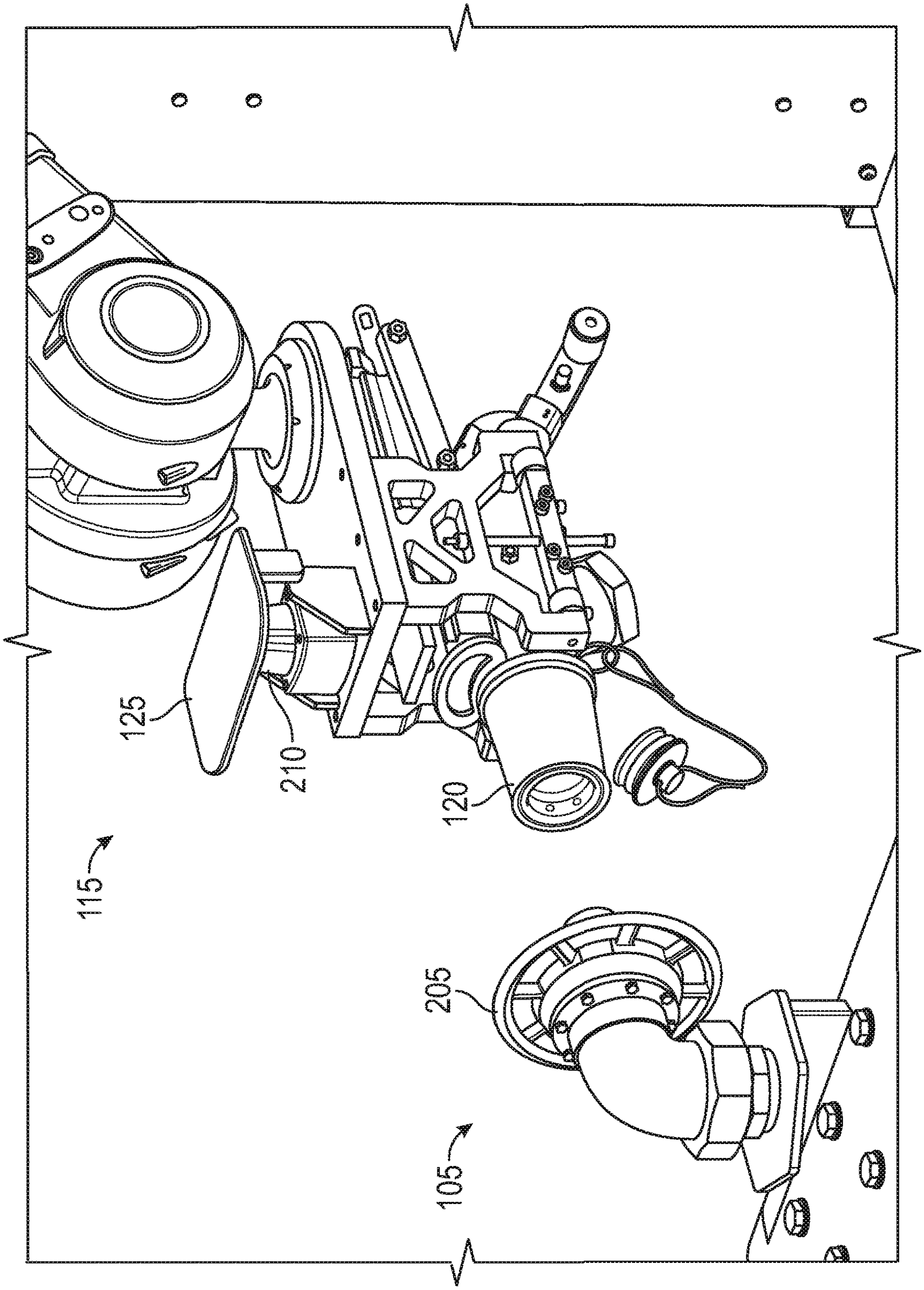
FIG. 2 shows an end effector and fuel port of an autonomous refueling system in accordance with various aspects of the present disclosure.
Figure 3A:
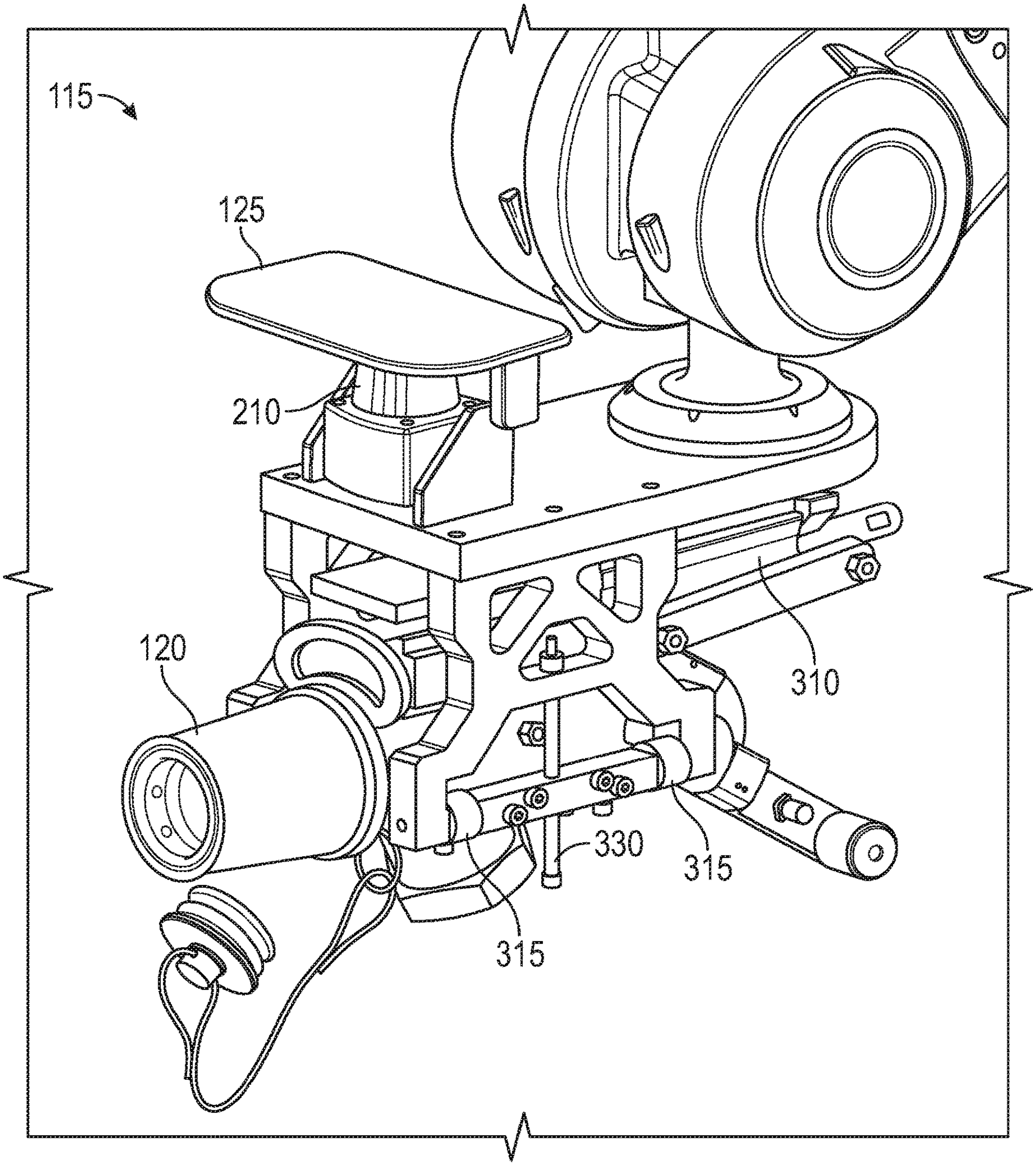
FIGS. 3A and 3B shows an end effector and associated components of an autonomous refueling system in accordance with various aspects of the present disclosure.
Figure 3B:
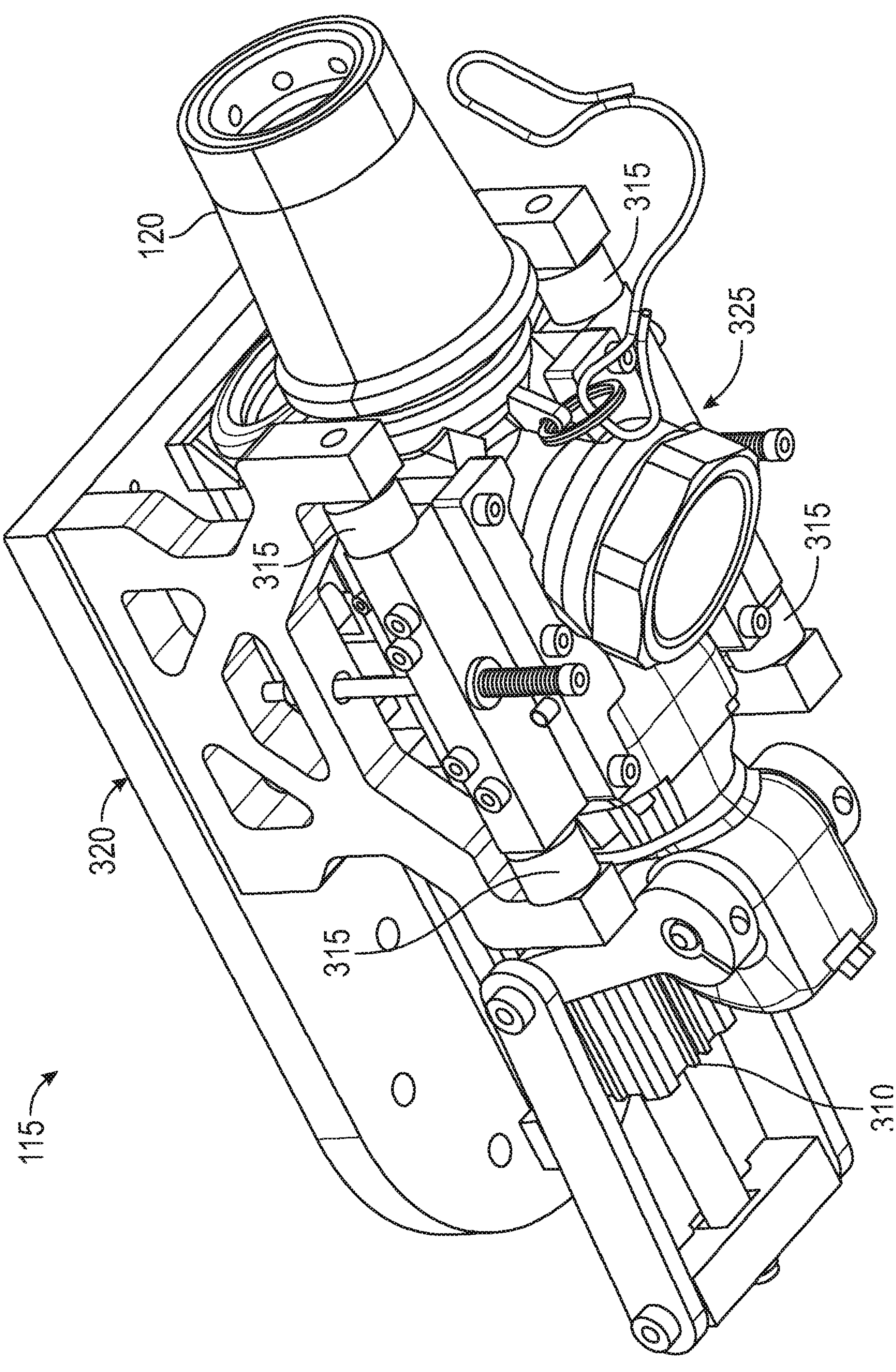
Figure 4:
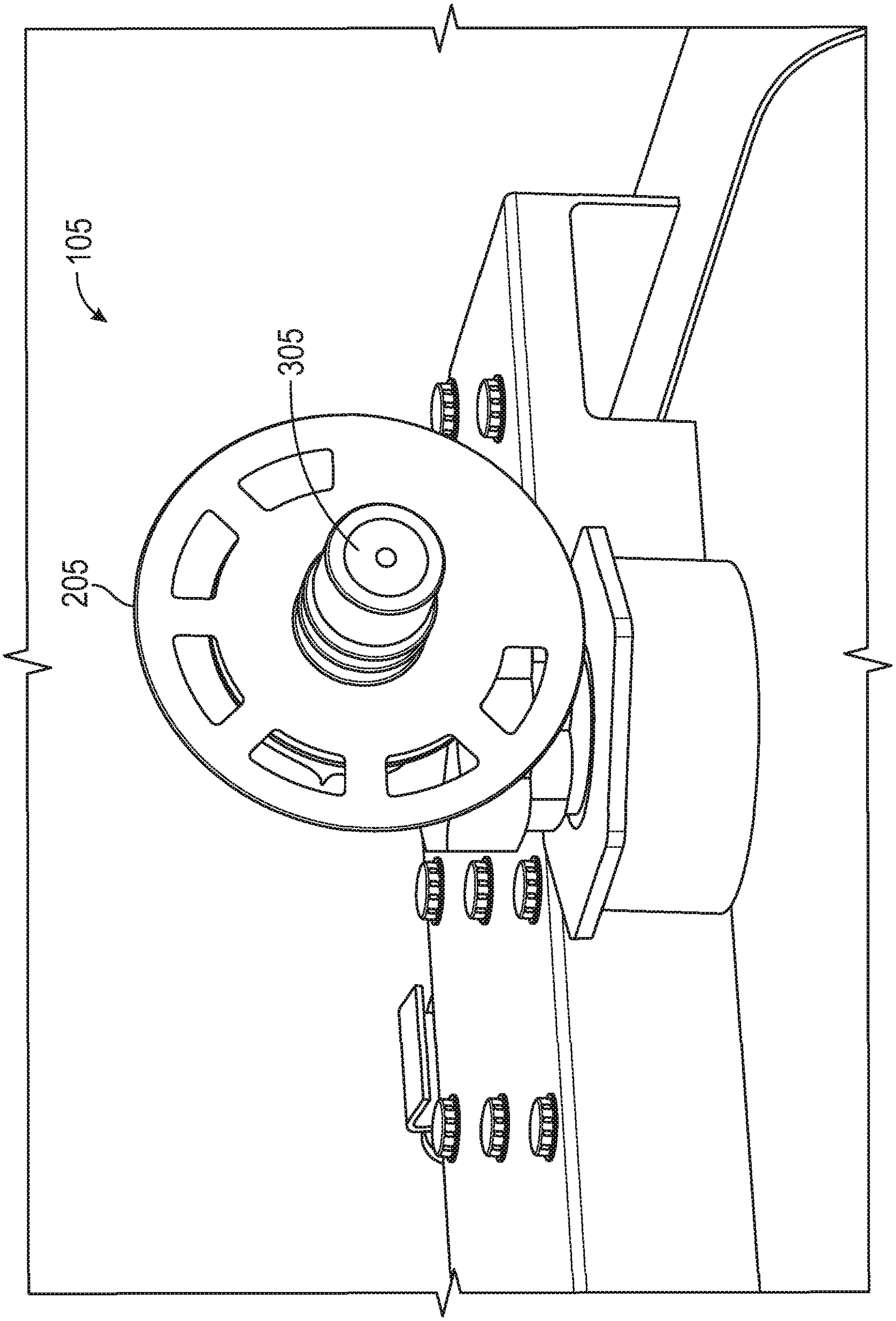
FIG. 4 shows a fuel port and associated components of an autonomous refueling system in accordance with various aspects of the present disclosure.

FIGS. 2 through 4 show different and more detailed views of the end effector 115 and fuel port 105. The fuel port 105, in some cases, includes a fiducial target 205 which is used to accurately position the fuel nozzle 120 around the fuel inlet 305. The fuel nozzle 120 may be a nozzle that is selected based on the fuel port 105 and fuel inlet 305, such that the fuel nozzle 120 pairs with the mating fuel port 105. The fuel nozzle 120 mounts to the end effector 115 at the end of the robotic arm 130, and is coupled with a fuel hose or piping and includes a valve to control the flow of fuel when mated with the fuel port 105. In some cases, the fuel nozzle 120 may be selected based on one or more factors, such as fuel type, pressure, hose diameter, engagement motion requirement, dripless fuel transfer capabilities, valve opening mechanics, safety, cost, or any combinations thereof. In some cases, different fuel nozzles 120 may be available, and a particular nozzle selected based on the particular vehicle to be fueled (e.g., by manually switching nozzles, or by selection of a nozzle by the control system using a tool changer mechanism). In some cases, the fuel port 105 is an existing structure that is manufactured into a vehicle or aircraft (or other piece of equipment).

The sensor suite 125 may include one or more sensors 210 on the end effector 115 that use the fiducial target 205 to accurately position the fuel nozzle 120 around the fuel port 105. The sensors 210 may include, for example, optical sensors or LIDAR sensors that provide LIDAR or camera data to capture the position of the fuel port 105 and direct the engagement of the system. Depending on the sensing system used, the fiducial target 205 may be a geometric fiducial, a visual fiducial, or a combination of both. In other cases, additionally or alternatively, various different sensors of combinations thereof may be used, such as, positioning sensors, IMUs, proximity detectors, cameras, stereographic imaging sensors, ultrasonic sensors, or any combinations thereof. In some cases, 3D sensor units may be used that may provide data that may be used for 3D sensing around a system, such as stereographic imaging sensors, ultrasonic sensors, 3D flash LIDAR, LIDAR, radar, and cameras coupled with image processing and recognition, for example.

The end effector 115 in this example, as illustrated more closely in FIGS. 3A and 3B, is coupled with the end of the robotic arm 130 and includes the fuel nozzle 120, sensor suite 125, and a compensation mechanism 315 that allows for small errors in the positioning system by allowing small movement of the fuel nozzle 120 relative to the robotic arm 130. In some cases, one or more actuation components to manipulate the fuel nozzle 120 or on-vehicle systems are also located on the end effector, such as linear actuators 310 to open or close the valve system on the end effector 115 (e.g., to actuate fuel nozzle 120 through different states to deliver fluid to the target vehicle). In some examples, the compensation mechanism 315 may include one or more mechanical isolators (e.g., springs or elastic elements) or pneumatic actuators coupled with mechanical linkages to provide fine-tuning of the alignment of the fuel nozzle 120 with the fuel port.

In some examples, the compensation mechanism 315 may be provided by mechanical isolators (e.g. four rubber isolators arranged in a rectangular formation on each side of the fuel nozzle 120, as illustrated in FIG. 3B). In this example, the isolators separate the fixed mount 320 from a floating section 325. This exemplary isolator configuration has a relatively stiff response axially along longitudinal axis of the fuel nozzle 120 (e.g., isolators in tension/compression) and a relatively softer response in a plane perpendicular to the fuel nozzle 120 axis (e.g., isolators in shear). In this example, the compensation mechanism 315 has no breakaway load, and the fuel nozzle 120 begins to move when as a load is applied. In addition to the isolators, a compression spring 330 may be set to counteract the load of the fuel nozzle 120 due to gravity. In this example, the compensation mechanism 315 provides compensation mechanically and is not controlled by a separate controller. In other cases, one or more motors or actuators may perform fine-tuning compensation based on input from one or more sensors such as pressure sensors (e.g., piezoelectric sensors) that detect pressure on one or more axes. These methods of mechanical compensation can allow for autonomous fueling of vibrating vehicles or aircraft due to functions such as engine idling.

Figure 5:
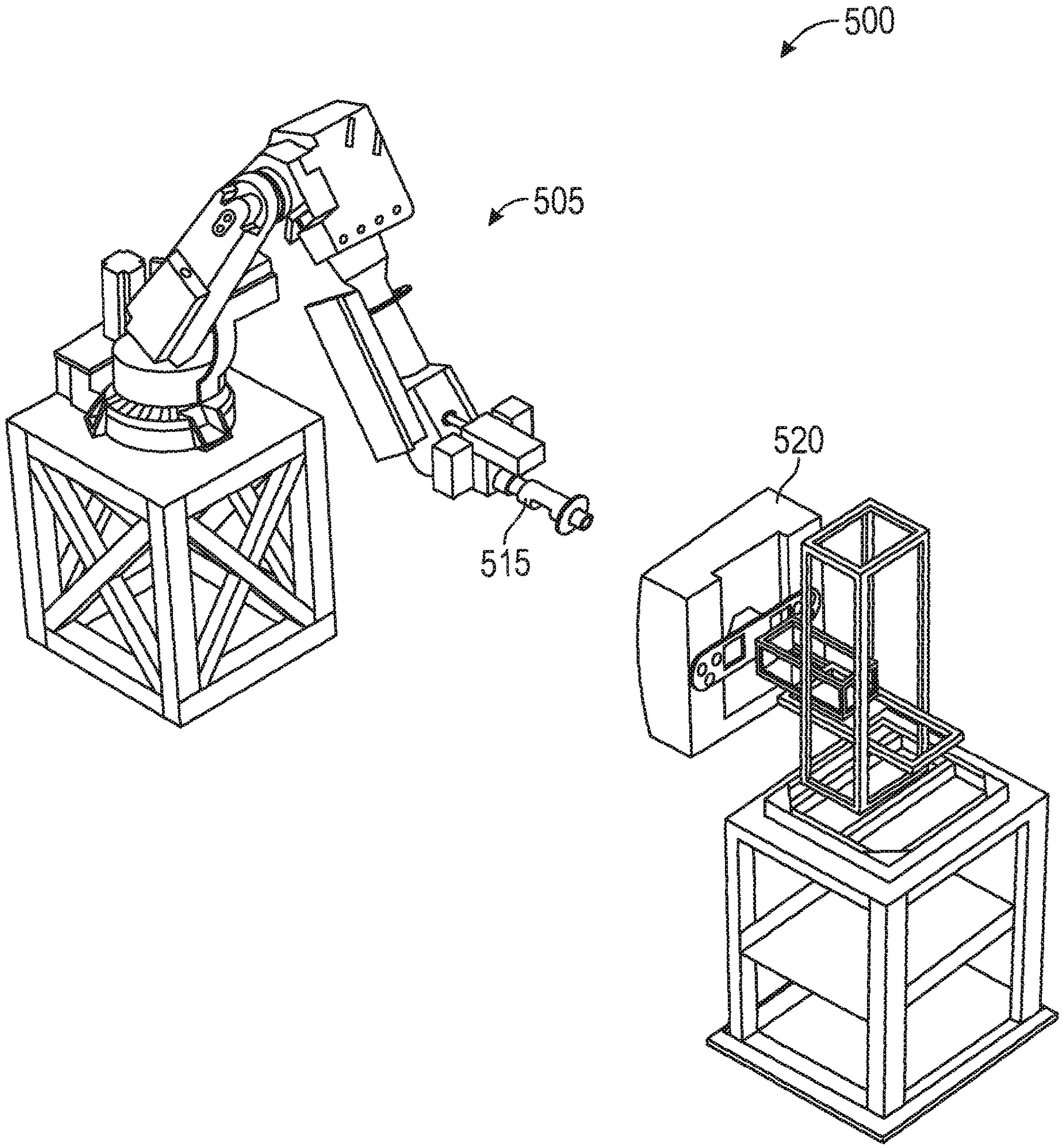
FIGS. 5 through 7 show another example of an autonomous refueling system in accordance with various aspects of the present disclosure.
Figure 6:
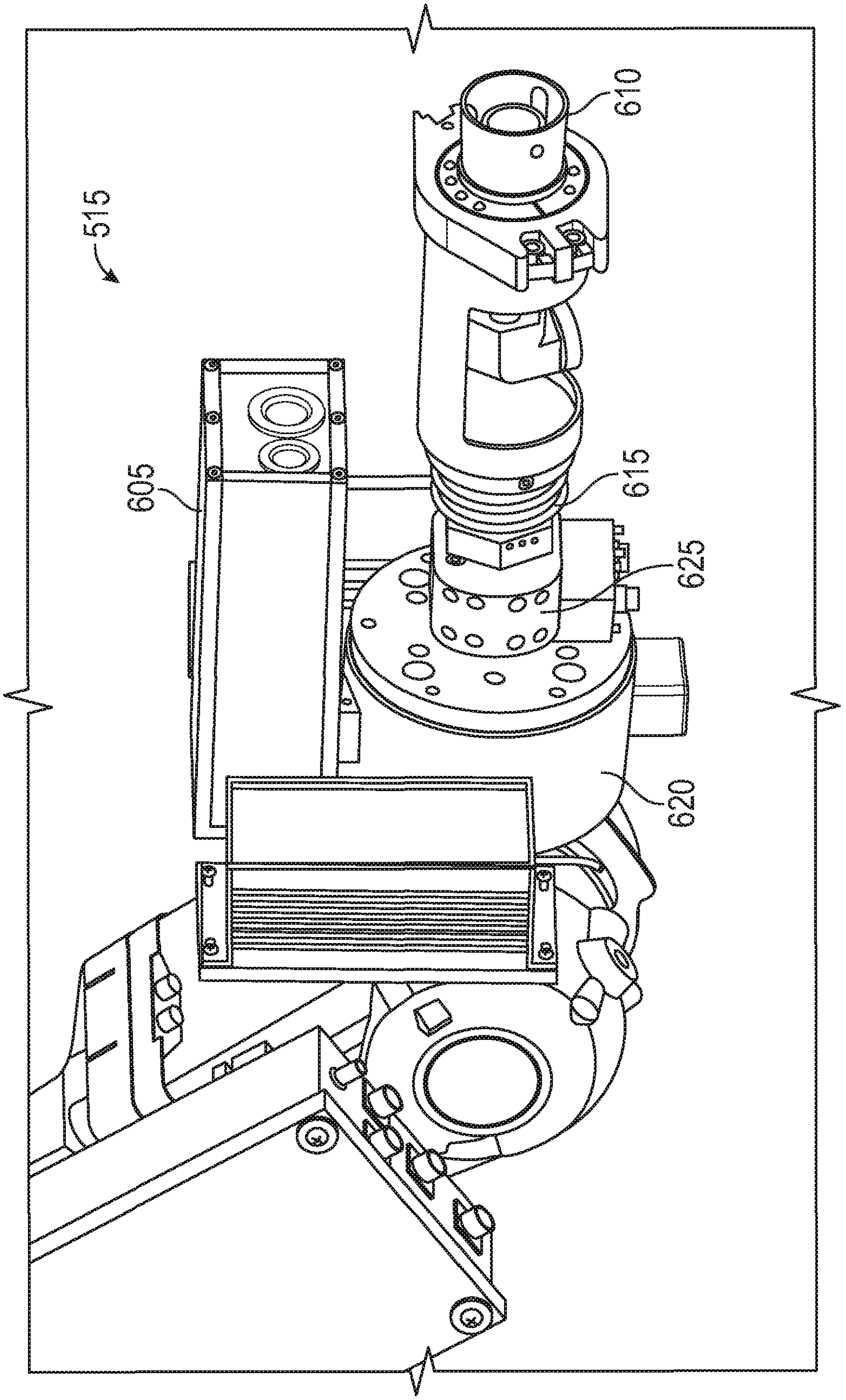
Figure 7:
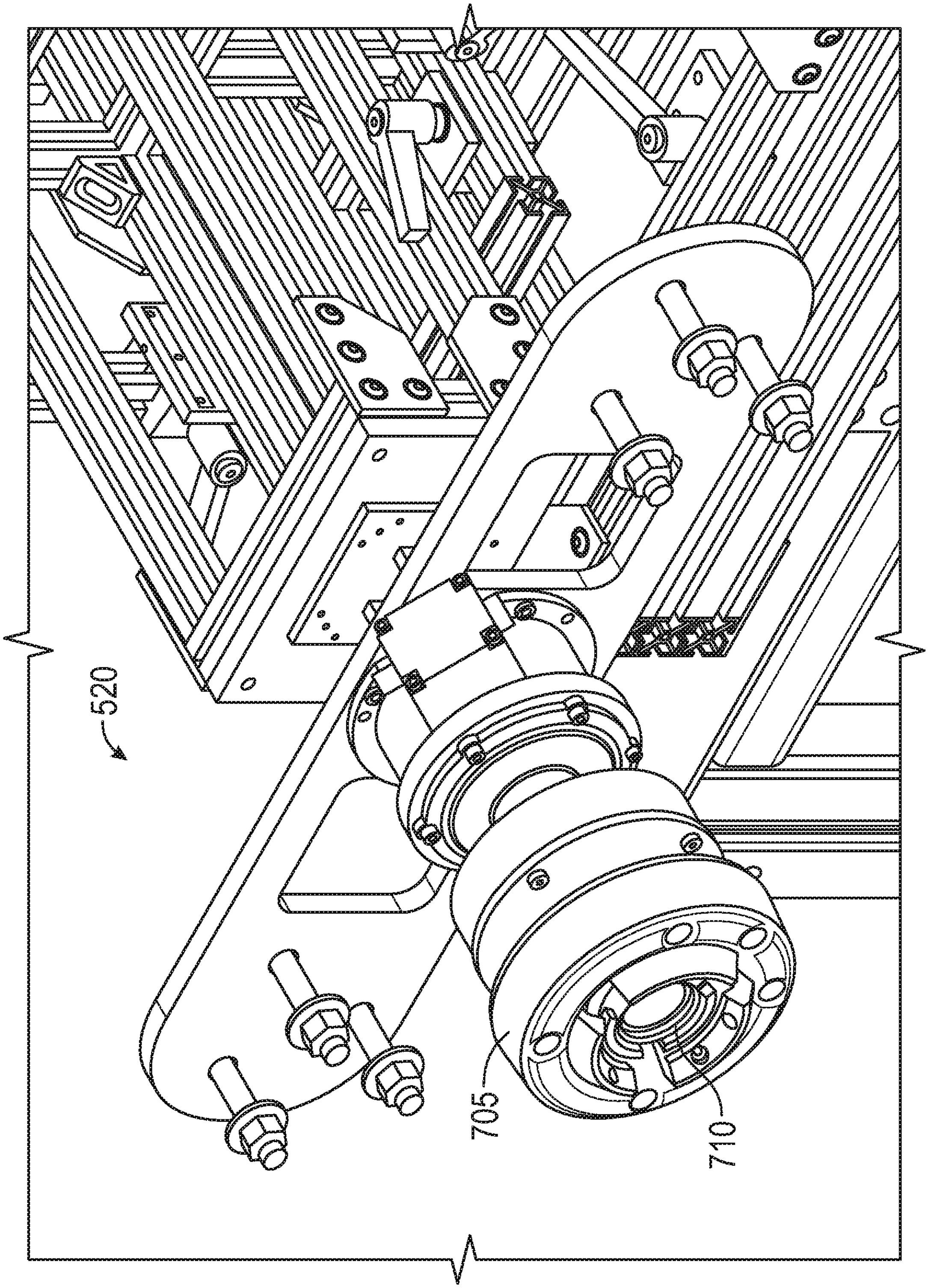

FIGS. 5 through 7 show another example of an autonomous refueling system 500 in accordance with various aspects of the present disclosure. In this example, a robotic arm 505 includes an end effector 515 configured for refueling using a helicopter fuel port 520. In this example, end effector 515 includes sensor suite 605, fuel nozzle 610, compensation mechanism 615, force torque sensor 620, and tool changer 625. The fuel port 520 includes a fiducial target 705 and fuel inlet 710. A control system associated with robotic arm 505 and end effector 515 may use the fiducial target 705 to guide the fuel nozzle 610 to the fuel inlet 710, and control supply of fluid to the target vehicle, in accordance with techniques as discussed herein. In one example, actuation of the refueling operation for autonomous refueling system 500 is provided by a rotation carried out by the arm 505 itself (e.g., a rotation of 120°) that opens a valve in the fuel nozzle 610 and actuates a secondary valve within fuel inlet 710. Further, in the example of autonomous refueling system 500, compensation mechanism 615 is a pneumatic unit (e.g., an accordion-shaped boot or bellows) that allows for some amount of axial, lateral, and/or angular movement. In this example, pressure within the compensation mechanism 615 can be set at different levels to control the break-away point of the fuel nozzle 610. In this case, the mechanism may support the moment load that results from the fuel nozzle 610 being mounted at the end of the end effector 515. In another example the tool changer mechanism 625 could be used to release a fuel nozzle (and associated supply piping) while engaged with a first vehicle and transferring fuel, which may allow the control system to guide the robotic arm to connect an alternative end effector and simultaneously refuel a second vehicle or connect to a second port of the first vehicle to concurrently transfer fuel or other material via the second port and the alternative end effector (and associated supply piping). In another example the force torque sensor 620 may be used to sense in real-time if the vehicle has moved significantly with the fuel nozzle(s) engaged, and the control system may guide the robotic arm to a new position that reduces stress on the equipment.

Figure 8:
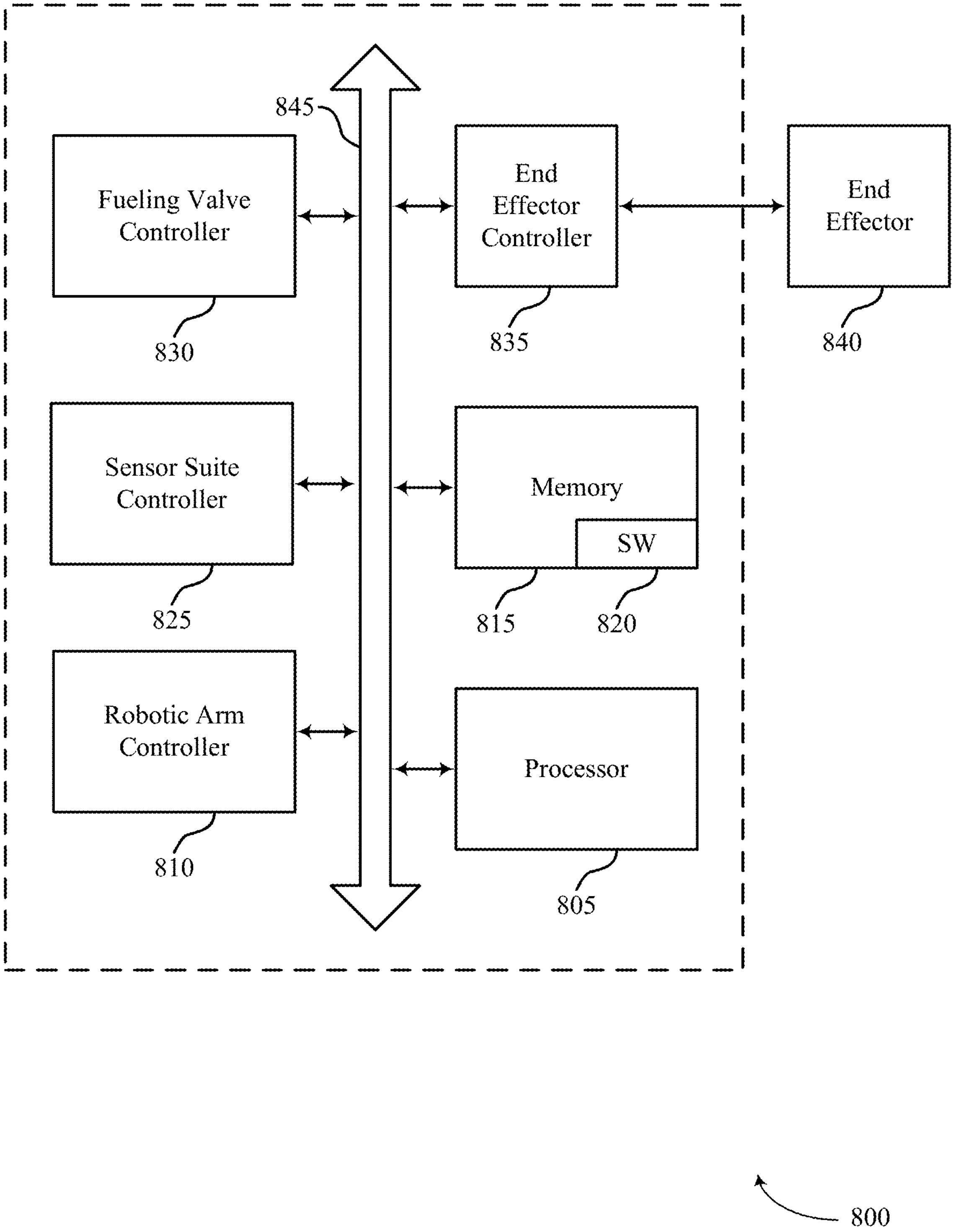
FIG. 8 shows exemplary subcomponents or subsystems of an autonomous refueling system in accordance with various aspects of the present disclosure.

FIG. 8 illustrates an exemplary block diagram of a control system 800 for an autonomous refueling system of some aspects of the disclosure. As illustrated in FIG. 8, the control system 800 may include one or more processors 805, a robotic arm controller 810, a memory 815 that stores code 820 (e.g., software), a sensor suite controller 825, a fueling valve controller 830, and an end effector controller 835 coupled with end effector 840. These components may be in electronic communication or otherwise coupled (e.g., operatively, communicatively, functionally, electronically, electrically) via one or more buses (e.g., a bus 845).

The one or more processors 805 may also be coupled with one or more control interfaces (e.g., for operator control or programming of the system). In some cases, the one or more processors 805 may receive data from sensor suite controller 825 (e.g., optical data or LIDAR data of a fiducial target, proximity data, etc.), and may send commands to the robotic arm controller 810, and effector controller 835, and fueling value controller 830, to couple the end effector 840 with the fueling port and provide fluid to the target vehicle. In some cases, the one or more processors 805 may be part of a computer and autonomy system that is coupled with the sensor suite, a database of vehicle fuel port parameters and fueling parameters, e-stop controls, and operator control unit(s). In some cases, the one or more processors 805 may utilize an operating system such as iOS®, ANDROID®, MS-DOS®, MS-WINDOWS®, OS/2®, UNIX®, LINUX®, or another known operating system. Additionally or alternatively, the one or more processors 805 may represent or interact with a modem, a keyboard, a mouse, a touchscreen, or a similar device.

The memory 815 may include random access memory (RAM) and read-only memory (ROM). The memory 815 may store computer-readable, computer-executable code 820 including instructions that, when executed by the processor(s) 805, cause the control system 800 to perform various functions described herein. The code 820 may be stored in a non-transitory computer-readable medium such as system memory or another type of memory. In some cases, the code 820 may not be directly executable by the processor(s) 805 but may cause a computer (e.g., when compiled and executed) to perform functions described herein. In some cases, the memory 815 may contain, among other things, a basic I/O system (BIOS) which may control basic hardware or software operation such as the interaction with peripheral components or devices.

The one or more processors 805 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 805 may be configured to operate a memory array using a memory controller. In some other cases, a memory controller may be integrated into the processor 805. The processor 805 may be configured to execute computer-readable instructions stored in a memory (e.g., the memory 815) to cause the control system 800 to perform various functions (e.g., functions or tasks supporting autonomous refueling techniques).

Figure 9:
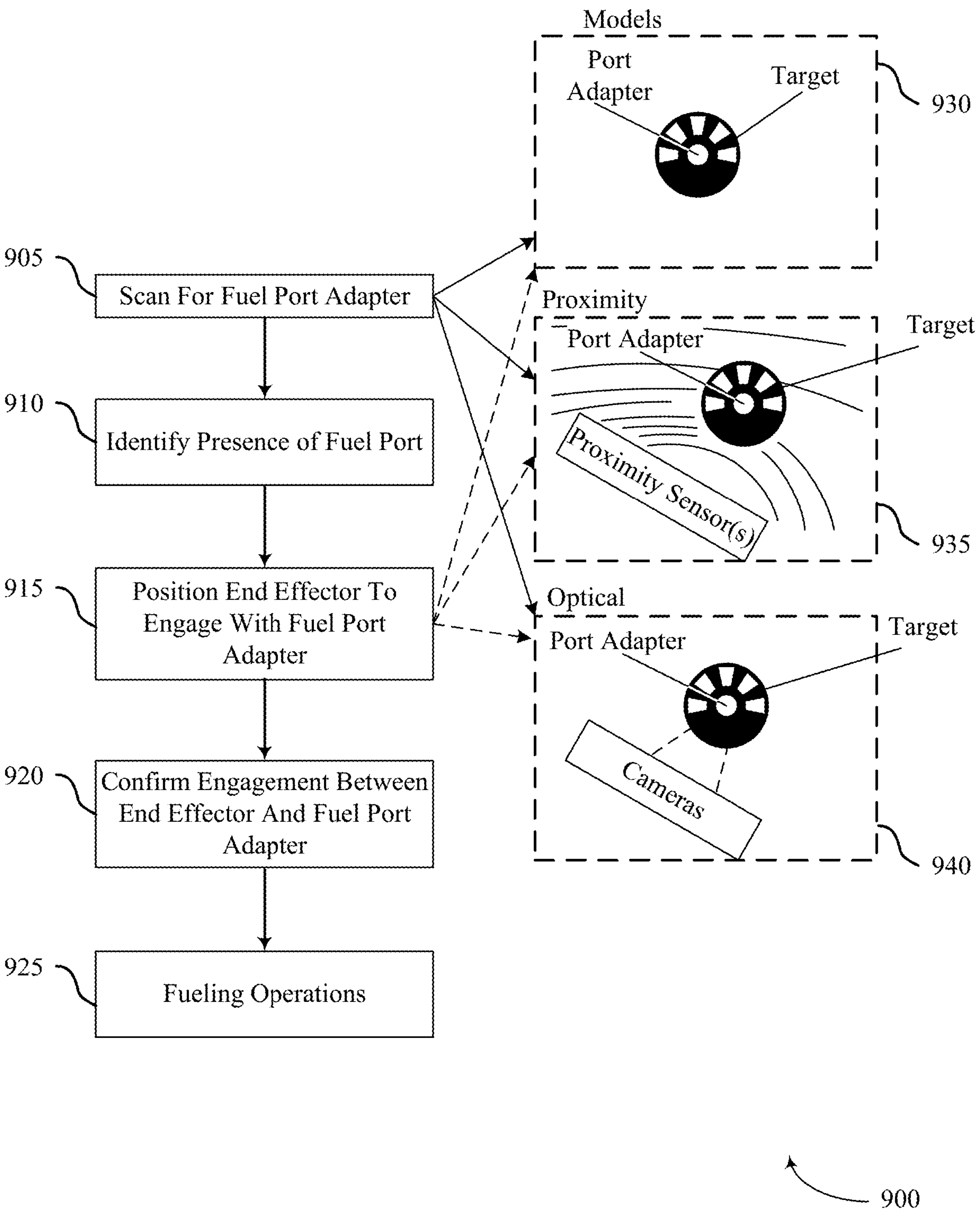
FIG. 9 shows an exemplary process flow for an autonomous refueling system in accordance with various aspects of the disclosure.

FIG. 9 illustrates a process flow for autonomous refueling operations in accordance with aspects of the disclosure. In this example, at 905, the autonomous refueling system may scan for a fuel port adapter. In some cases, the sensing for the fuel port adapter may use one or more models 930 (e.g., optical models of fiducial targets, 3D models of fuel ports, etc.) along with one or more inputs from a proximity detection 935 function or optical detection 940 function. At 910, the autonomous refueling system may identify the presence of a fuel port. In some cases, the sensing of a fuel port may use a one or a combination of sensors of the sensor suite, that may be used to generate an image of the port adapter that may be compared to models 930 to classify the port adapter detect proper fuel nozzle orientation and position. In some case, LIDAR sensing, optical sensing, and proximity sensing may be used in combination (in some cases called "sensor fusion") to sense the presence of the fuel port. In some cases, a vehicle or piece of equipment, or fuel port, may include optical or electronic markers that may be used in port sensing (e.g., a predefined optical/electronic target that may attached to the fuel port that indicates an end/orientation of the object). In some cases, an optical or electronic marker (e.g. a QR code or bar code) may indicate a type of vehicle or identification of the vehicle that may be used for identification physical fueling characteristics (e.g., amount or type of fuel or other liquid to be exchanged, etc.), fuel consumption tracking, billing, analytics, and the like.

At 915, the autonomous refueling system may position the end effector to engage with the fuel port adapter. In some cases, continuous or near-continuous feedback from the sensor suite may be used to guide a robotic arm and end effector to be in proximity to the fuel port and engage with the port. In some cases, continuous or near-continuous feedback from the sensor suite may be used to dynamically guide a robotic arm and end effector in such a way as to avoid obstacles such as a vehicle fender, aircraft wing, or nearby human observer. In some cases, fine-tuning of a fuel nozzle with the port may be performed using a compensation mechanism at the end effector. At 920, the autonomous refueling system may confirm engagement between the end effector and the fuel port adapter. In some cases, when the fuel nozzle is fully engaged with the fuel port, a sensor (e.g., a pressure sensor associated with a seal or gasket) may output an indication of engagement, and the fuel nozzle may be actuated to be mechanically coupled with the fuel port. At 925, the autonomous refueling system may conduct fueling operations to refuel the target vehicle (e.g., by actuating a valve to allow fuel to flow to the target vehicle).

As discussed herein, autonomous refueling system may perform a number of functions that provide for efficient refueling operations, including sensing fuel ports that may have varying locations and positioning, to enable autonomous refueling of a vehicle, aircraft, or other piece of equipment. While various examples discussed herein are for refueling applications, as will be readily understood by one of skill in the art, the described techniques may be used for various different types of transfers of materials, or for electrical connections (e.g. for recharging of batteries on a vehicle or piece of equipment, data transfer, etc.).

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A refueling apparatus, comprising:

a carriage system comprising a robotic arm with a first end coupled with a support structure and a second end movable relative to the first end;

an end effector coupled with the second end of the robotic arm, the end effector including a fuel nozzle and a compensation system coupled between the second end of the robotic arm and the fuel nozzle, the compensation system comprising one or more mechanical isolators coupled with one or more mechanical linkages and one or more actuators coupled with the one or more mechanical linkages, the one or more actuators being configured to translate the fuel nozzle relative to the second end of the robotic arm in at least one direction transverse to a longitudinal axis of the fuel nozzle, wherein an actuation of the one or more actuators is to provide fine-tuning of an alignment of the fuel nozzle with a fuel port;

a sensor suite configured to output a location of the fuel port; and a controller system coupled with the end effector, the carriage system, the compensation system, and the sensor suite, the controller system comprising one or more processors and a memory in electronic communication with the one or more processors and code stored in the memory that, when executed by the one or more processors, to cause the controller system to:

identify the location of the fuel port on a vehicle;

move the second end of the robotic arm to position the end effector in proximity with the fuel port;

adjust the fuel nozzle using the compensation system while maintaining the second end of the robotic arm in a fixed pose by continuously or near-continuously receiving feedback from the sensor suite and closed-loop commanding the one or more actuators to reduce an alignment error between the fuel nozzle and the fuel port prior to engagement of the fuel nozzle with the fuel port to engage the fuel nozzle with the fuel port; and provide fuel to the vehicle responsive to the engagement of the fuel nozzle with the fuel port.

2. The refueling apparatus of claim 1, wherein the one or more processors are further operable to execute the code to cause the controller system to:

identify a fiducial target associated with the fuel port based on the output of the sensor suite;

move the second end of the robotic arm to position the end effector in proximity with the fuel port based at least in part on a location of the fuel port relative to the fiducial target; and align and engage the fuel nozzle with the fuel port using the compensation system.

3. The refueling apparatus of claim 2, wherein:

the sensor suite comprises one or more of a positioning sensor, proximity detector, optical camera, ultrasonic sensor, LIDAR sensor, or any combinations thereof, and wherein the fiducial target is identified by the controller system based at least in part on signals provided by the sensor suite.

4. The refueling apparatus of claim 2, wherein:

the sensor suite further comprises a vehicle detection and identification sensor, and wherein the controller system identifies a particular vehicle for identification of associated refueling characteristics based at least in part on information from the vehicle detection and identification sensor.

5. The refueling apparatus of claim 4, wherein:

the vehicle detection and identification sensor comprises one or more of an optical scanner, radar, radio frequency identification (RFID) tag reader, or any combinations thereof.

6. The refueling apparatus of claim 5, wherein:

the one or more processors are further operable to execute the code to cause the controller system to output a vehicle identification and an amount of fuel provided to a revenue management or analytics system.

7. The refueling apparatus of claim 1, wherein:

the compensation system provides fine-tuning of the fuel nozzle relative to the fuel port via the one or more mechanical linkages that adjust a position of the fuel nozzle with finer resolution than is provided by the carriage system.

8. The refueling apparatus of claim 7, wherein:

the compensation system further comprises one or more actuation components coupled between the fuel nozzle and the end effector, one or more mechanical isolators, or any combinations thereof.

9. The refueling apparatus of claim 7, wherein:

the compensation system further comprises a compression spring coupled between the fuel nozzle and the end effector that counteracts a load of the fuel nozzle due to gravity.

10. The refueling apparatus of claim 1, wherein:

the compensation system provides mechanical compensation to allow for autonomous fueling of vibrating vehicles or aircraft.

11. The refueling apparatus of claim 1, further comprising:

a valve system coupled with the fuel nozzle, and wherein the controller system is configured to actuate the valve system to provide for flow of fuel between a fuel supply and the fuel port.

12. The refueling apparatus of claim 11, wherein:

actuation of the valve system is provided by a rotation carried out by the carriage system that opens one or more valves coupled with the fuel nozzle and that further actuates a secondary valve within the fuel port.

13. The refueling apparatus of claim 11, wherein:

the sensor suite further comprises a pressure sensor coupled with a seal or gasket within the fuel nozzle, and wherein actuation of the valve system is performed responsive to an output of the pressure sensor that indicates the fuel nozzle is fully coupled with the fuel port.

14. The refueling apparatus of claim 1, wherein the fuel includes electricity.

15. A method, comprising:

identifying a location of a fuel port on a vehicle;

causing a robotic arm to position a fuel nozzle in proximity with the fuel port based on an output of a sensor suite;

causing an adjustment of the fuel nozzle using a compensation system coupled between the robotic arm and the fuel nozzle, the compensation system comprising one or more mechanical isolators coupled to one or more mechanical linkages and one or more actuators coupled with the one or more mechanical linkages, the one or more actuators being configured to translate the fuel nozzle relative to the robotic arm in at least one direction transverse to a longitudinal axis of the fuel nozzle, the adjustment being performed while maintaining the robotic arm in a fixed pose, to engage the fuel nozzle with the fuel port by continuously or near-continuously receiving feedback from the sensor suite and closed-loop commanding the one or more actuators to reduce an alignment error between the fuel nozzle and the fuel port prior to engagement of the fuel nozzle with the fuel port; and causing a provision of fuel to the vehicle responsive to the engagement of the fuel nozzle with the fuel port.

16. The method of claim 15, wherein the fuel includes electricity.

17. The method of claim 15 further comprising:

identifying a fiducial target associated with the fuel port based on the output of the sensor suite;

moving a second end of the robotic arm to position an end effector in proximity with the fuel port based at least in part on a location of the fuel port relative to the fiducial target; and aligning and engage the fuel nozzle with the fuel port using the compensation system.

18. The method of claim 15, wherein the sensor suite further comprises a vehicle detection and identification sensor, the method further comprising identifying a particular vehicle for identification of associated refueling characteristics based at least in part on information from the vehicle detection and identification sensor.

* * * * *